United States Patent Office 2,902,495
Patented Sept. 1, 1959

2,902,495

TREATMENT OF CERTAIN DERIVATIVES OF 2,6-DIMETHYL-OCTANE AND INTERMEDIATES

Robert L. Webb, Jacksonville, Fla., assignor to The Glidden Company, Cleveland, Ohio, a corporation of Ohio No Drawing. Application April 9, 1956
Serial No. 576,794

28 Claims. (Cl. 260—348)

The present invention is concerned with the treatment of 2,6-dimethyl-7-octene-2-yl compounds, and is particularly concerned with the conversion of these compounds to citronellal and hydroxy-citronellal.

Citronellal occurs at the main constituent of oil of citronella and is a constituent of a number of other essential oils. It is useful as a constituent of perfumes and for the scenting of soaps and for numerous other technical preparations, as is known to the art. As is known, it is also useful for conversion to isopulegol, which can be hydrogenated to menthol.

Hydroxy-citronellal, or more correctly 2-hydroxy-dihydro-citronellal, is employed as a valuable perfume ingredient and is ordinarily produced by the hydration of citronellal.

Citronellal or citronellal-bearing oil are imported natural products and as such are subject to wide fluctuations in cost. It is therefore desirable to produce it from domestic raw materials which are both cheap and plentiful, such as turpentine.

It is accordingly an object of the present invention to provide a process for producing citronellal.

A further object is to provide a process for producing hydroxy-citronellal.

Another object is to provide a process for converting domestically-available raw materials to citronellal and hydroxy-citronellal.

Another object is to produce citronellal and hydroxy-citronelal from 2,6-dimethyl-7-octene-2-yl compounds.

Still another object is to provide a new process for making valuable terpene compounds from cheap domestically-available raw materials.

Other objects will be apparent to those skilled in the art.

The starting materials for the present invention are the 2,6-dimethyl-7-octene-2-yl compounds, wherein the functional substituent in the 2-position is an —OH radical or a group readily converted to an —OH group by hydrolysis, or which may be removed together with a hydrogen atom at a later stage of conversion whereby a double bond is generated at the 1,2- or 2,3-position, such as Cl—, Br—, alkoxy and acyloxy radicals. These chlorides, bromides, ethers and esters are readily produced by the process of my copending application entitled, "Treatment of Certain Dienes and Products," Serial No. 576,795, filed April 9, 1956, by the treatment of 2,6-dimethyl-2,7-octadiene with a compound of the formula HX in the presence of a strong acid, X being a Cl—, Br—, alkoxy or acyloxy radical. The 2,6-dimethyl-2,7-octadiene is obtainable by pyrolysis of pinane, which, in turn, is produced by hydrogenation of either α- or β-pinene.

The first step in the process of my invention is to convert the starting material to the corresponding 7,8-epoxy derivative. The second step consists of simply heating the hydroxy epoxide at 200° C. or above, whereby the epoxide is isomerized to the aldehyde with formation of hydroxy-citronellal and with some dehydration and consequent formation of α-citronellal. It will be understood that the foregoing applies only to the hydroxy epoxide and that if the substituent in the 2-position is halogen or acyloxy, this compound should be hydrolyzed to the hydroxy epoxide if hydroxy-citronellal is to be produced. If citronellal is to be produced, then the elements of HX can be removed from the epoxide to produce the unsaturated epoxide prior to pyrolysis. If the substituent in the 2-position is alkoxy, then HX is difficult to remove without rupture of the epoxy group, and it is preferred to pyrolyze such 2-alkoxy epoxides and remove the alkoxy group from the resultant alkoxy aldehyde or its derivatives if such removal be desired.

I have employed several methods for introducing the epoxy group. One of these involves production of a chlorohydrin, followed by treatment with a basic material to form the epoxide.

Preparation of the chlorohydrin can be conducted by passing chlorine into an aqueous dispersion of the 2,6-dimethyl-7-octen-2-yl compound and in the presence of a base. Ordinarily, however, I will prefer to agitate a mixture of the unsaturated 2-yl compound with sodium hypochlorite, calcium hypochlorite, or the equivalent hypochlorite solution and generate free hypochlorous acid in situ through the additive of weak acid to the mixture. Any weak acid is suitable, but carbon dioxide is convenient and cheap.

Methods suited to production of chlorhydrins are discussed by Ellis, The Chemistry of Petroleum Derivatives, The Chemical Catalog Company, New York (1934), vol. I, pp. 486–504, inclusive, and vol. II, pp. 515–531, and such methods are generally applicable to preparation of the chlorhydrin of 2,6-dimethyl-7-octene-2-yl compounds. Thus, I have chlorinated the unsaturated alcohol with chlorine gas in the presence of water, in the presence of aqueous sodium carbonate, in the presence of 10% aqueous sodium hydroxide, and I have also employed such reagents as chloramides and organic hypochlorites. The in situ generation of hypochlorous acid by action of carbon dioxide on sodium or calcium hypochlorite is satisfactory and economical, however, and more elaborate methods are not required.

The addition of the hypochlorous acid to the olefinic alcohol is best conducted at about −10 to 5° C. Appreciably lower temperatures can be used, but do not give sufficiently improved yields as to justify the extra expense involved, and appreciably higher temperatures cause some decrease in yield.

Alternatively, I can produce an ester of the desired chlorohydrin by treating a mixture of the unsaturated alcohol, a lower carboxylic acid such as formic or acetic and a salt of either of these acids or equivalent acids with chlorine. The presence of this salt is not necessary, but is very desirable, since better yields are obtained if the hydrogen chloride set free is neutralized as formed. During this treatment, more or less esterification of the tertiary hydroxyl group may take place, but this is not objectionable, and, in fact, I find that esters of the unsaturated alcohol or other 2,6-dimethyl-7-octene-2-yl compound can be employed as equivalents to the free alchol, since the nature of the group attached at the 2-position does not affect the addition of hypochlorous acid to the double bond at the other end of the molecule.

Thus, the formate of 2,6-dimethyl-7-octene-2-ol which is readily prepared either by esterification of the alcohol or of 2,6-dimethyl-2,7-octadiene can be treated with, say, a three-fold volume of acetic acid and 50% by weight sodium acetate and then chlorinated to produce 2-formoxy-7-acetoxy-8-chloro-2,6-dimethyl-octane. Formate esters are easily hydrolyzed and care would need be given in isolating such esters. In general, however, it is not necessary or desirable to isolate such esters of the chlorhydrin as it is convenient to simply saponify them prior to or during the conversion of the chlorhydrin to citronellal or hydroxy-citronellal.

The addition of hypochlorous acid to the double bond of the starting material is not the exclusive reaction product, but this reaction is always accompanied by more or less chlorination which results in formation of a dichloride, as shown in Equation I. The dichloride and the chlorhydrin could be separated if desired as by fractional distillation in very high vacuum or by selective solvent extraction, but since the dichloride is much more stable toward alkali and heat than the chlorhydrin, it is not necessary to make this separation. In general, it will be found most satisfactory to treat the crude chlorhydrin as with alkali to remove the very labile elements of hydrogen halide it contains and then separate the dichloride from this more stable reaction product. The separated dichloride can then be processed as disclosed later in this writing.

Having prepared the chlorhydrin of 2,6-dimethyl-7-octene-2-ol or its chloro, bromo, acyloxy or alkoxy homologue, I can then treat it with an aqueous base, preferably in excess over that required for dehydrochlorination plus that required, if any, for saponification of acyloxy or halogen groups. Such treatment, suitably at 80 to 120° C. for one or two hours, when caustic soda is used causes almost quantitative conversion of the chlorhydrin to the corresponding oxide, 2,6-dimethyl-7,8-epoxy-octane-2-ol, and/or its dehydration product, 2,6-dimethyl-7,8-epoxy-1-octene, except that where the substituent in the 2-position is alkoxy, the alkoxy epoxide results. Instead of caustic soda, one can use lime, caustic potash, sodium carbonate, etc., but caustic soda is satisfactory and cheap and provides for somewhat more rapid reaction than do less strong or less soluble bases. The temperature is not critical, but low temperatures require longer reaction time, and higher temperatures may cause decomposition of the epoxy alcohol, whereas temperatures around 100° C. are satisfactory and convenient.

If the substituent in the 2-position is halogen, then more or less dehydrohalogenation may take place depending on the temperature, concentration and identity of the base. If hydroxy-citronellal is to be produced, conditions should be those best suited to hydrolysis, i.e., lower concentration of base and large proportions of water. If citronellal is to be produced, then higher concentrations of base and less or almost no water will tend to give more of the unsaturated epoxide suitable for citronellal production.

If a mixture of the chlorhydrin and the dichloride are processed as above with a base, the reaction mixture resulting will contain the dichloride unchanged, and the chlorhydrin will have been converted to an epoxide. The epoxy alcohol, unsaturated epoxide or alkoxy epoxide can be readily purified at this point, since they are stable to vacuum fractionation and boil at least 12–15° C. below the dichloride. Again, however, the corresponding dichloride is stable toward the following treatment and need not be separated from the epoxy compound prior to treatment of the latter to convert it to citronellal and/or hydroxy-citronellal.

The epoxy alcohol converts upon simple heating at about 200° C. or above to hydroxy-citronellal which may be accompanied by more or less of its dehydration product, citronellal, depending upon the degree of heat treatment. The initial product of the treatment is hydroxy-citronellal, but this compound dehydrates on longer or more vigorous treatment to citronellal. If it is desired to produce hydroxy-citronellal, we therefore prefer to heat the epoxy compound at as low a temperature as possible to rupture the epoxy ring, but to avoid dehydration as much as possible. Vapor phase pyrolysis would be suited to such processing, it being necessary only to heat a tube to, say, 450 to 600° C. and pass the vapor of the epoxide through the tube at such a rate that the epoxy ring would rupture, but the time of passage of the vapor would be so short that dehydration would not take place to a substantial degree. The hydroxy-citronellal can be isolated from the crude pyrolysis product in any suitable manner. It is satisfactory to extract such crude reaction products, containing dichloride or not, with a bisulfite solution, whereupon the aldehyde is dissolved through formation of the well-known water-soluble adduct and any accompanying non-aldehyde products are separated as water-insoluble products by decantation, and, if desired, extraction of the aqueous solution with an immiscible solvent. Regeneration of the hydroxy-citronellal is readily accomplished by rendering the aqueous solution alkaline with sodium hydroxide and separating the regenerated aldehyde by decantation. Such purification is also applicable to citronellal and any citronellal present in the pyrolysis mixture will accompany the hydroxy-citronellal and can be separated from the latter by vacuum fractional distillation.

If citronellal is desired, it is not necessary to pyrolyze the epoxide as carefully, and, in fact, acid catalysts can be employed to bring about simultaneous conversion of the epoxide group to aldehyde and dehydration of the tertiary hydroxy group. Traces of strong acids such as benzene sulfonic acid, chloracetic acid, sulfuric acid, phosphoric acid, etc. can be employed. It is known that such acids cause dehydration of hydroxy-citronellal to the isopropenyl form of citronellal, the form which results from the process of this invention. I ordinarily prefer, however, to isolate hydroxy-citronellal in maximum quantity, since it is much higher priced than is the ordinary citronellal, isopropylidene form, of commerce. Also the unsaturated epoxide can be thermally isomerized as well as the 2-yl epoxides.

Alternatively, the epoxide need not be isolated as such or in admixture, since I have found that the chlorhydrin, either pure or in admixture with the dichloride can be converted to the aldehyde by heating it, preferably with a base, at a temperature sufficient to yield the aldehyde in a single operation. The base can be sodium carbonate, calcium carbonate or an organic base, though ordinary lime, calcium hydroxide, is satisfactory and cheap and therefore is preferred. It is desirable to remove the aldehyde from the base as the aldehyde forms in order to avoid undesirable base catalyzed condensation reactions, and therefore I prefer to heat the chlorhydrin and base under sufficient vacuum to cause the aldehyde to distill out of the reaction mixture as formed. Thus, it is satisfactory to heat the mixture of chlorhydrin with a quantity of base suitably in excess of that required to react with the hydrogen chloride evolved and at, say, 200–210° C. under 50 mm. absolute pressure. A mixture of water and hydroxy aldehyde distills, accompanied by some citronellal and any dichloride present in the chlorhydrin. During the decomposition and distillation, the mixture is stirred. When or if it becomes too difficult to stir, as in the latter stages of distillation, the distillation can be stopped and the undistilled portion dissolved in water containing enough hydrochloric or acetic acid to dissolve the unreacted base if a water-insoluble base were used. The undecomposed chlorhydrin can then be readily recovered and subjected to a further treatment with base.

It is believed that the chlorhydrin produced from 2,6-dimethyl-7-octene-2-ol is 2,6-dimethyl-8-chloro-octane-2,7-diol, but it is not unlikely that some 2,6-dimethyl-7-chloro-octane-2,8-diol may also be present and would yield the same epoxide on treatment with a base.

If the chlorhydrin is heated in absence of a base and at atmospheric pressure and until it decomposes with distillation, then the distillate will be substantially free of alcohols and will consist largely of 2,6-dimethyl-1-octene-8-al and the vinyl chloride, 8-chloro-2,6-dimethyl-1,7-octadiene. The former results from dehydrochlorination, dehydration and rearrangement and the latter from simple dehydration of the chlorhydrin.

It is to be noted from Equation I and Example 9 that a small amount of 2-hydroxy-2,6-dimethyl-octane-7-one results from decomposition of the crude chlorhydrin and can be isolated if desired. This compound can be dehydrated to the corresponding unsaturated ketone of pleasant odor by heating it with a trace of mineral acid to, say, 100° C., or it may be employed in other terpene synthesis.

The major by-product of hypochlorination of 2,6-dimethyl-7-octene-2-ol is 7,8-dichloro-2,6-dimethyl-octane-2-ol, which can also be readily produced by chlorination of the alcohol. It is readily dechlorinated to 2,6-dimethyl-7-octene-2-ol by means of sodium and alcohol in high yield, and the regenerated alcohol can then be recycled to a subsequent hypochlorous acid treatment for production of the desired chlorhydrin. Thus, while it is, of course, desirable to secure as high a yield of chlorhydrin as possible on each hypochlorous acid treatment, it is possible to reconvert the chief reaction by-product to the starting raw material.

It is also possible to dehydrate the 7,8-dichloro-2,6-dimethyl-octane-2-ol to 7,8-dichloro-2,6-dimethyl-2-octene, and, if desired, this latter compound can be dechlorinated to produce 2,6-dimethyl-2,7-octadiene. Also, the 7,8-dichloro-2,6-dimethyl-2-octene can be rehydrated to 7,8-dichloro-2,6-dimethyl-octane-2-ol by the method shown in Example 3 for hydration of 2,6-dimethyl-2,7-octadiene.

The dichlorides, 7,8-dichloro-2,6-dimethyl-octane-2-ol and its dehydration product, 7,8-dichloro-2,6-dimethyl-2-octene, are not, however, merely undesirable by-products useful only for dechlorination and recycling to hypochlorination. They are also most useful as intermediates for further syntheses in the terpenic field. Thus, they can be dehydrohalogenated readily to yield an alcohol, which in the case of the 2-ol is probably the allene, 2,6-dimethyl-6,7-octadiene-2-ol. The infrared curve shows some evidence of an allene structure, particularly a strong absorption at the 5.16μ ban, and little evidence of acetylenic structure. A quantitative test with ammoniacal silver nitrate was very faint and a quantitative test for acetylenic groups, Campbell and O'Conner, J.A.C.S. 61, 2899 (1939), showed about 4% acetylenic group. These same tests gave good results with 2-methyl-3-butyne-2-ol. Hydration using a mercury catalyst yields the 7-keto compound. Hydration of asymmetrically substituted acetylenes and allenes is known to give methyl ketones, see Gilman, Organic Chemistry, 2nd ed., vol. II, pp. 1907 and 1912 (1943). Thus, while the tests indicate that the dehydrochlorination product is the allene, the presence of at least some 2,6-dimethyl-7-octyne-2-ol is not altogether precluded.

The foregoing reactions can be illustrated by the following Equation I, it being understood that where $x$ is not —OH, hydrolysis will have produced the —OH group in the 2-position, and with the further understanding that where $x$ is alkoxy, it will usually be retained in the sequence of reactions illustrated.

Hypobromous acid produces analogous results.

I have also found that the 7,8-epoxy-2-yl compound can be formed directly by treatment of the Δ$^7$-octene-2-yl compound with per acids under weakly acidic conditions. The per acids can be either inorganic acids, such as pervanadic, pertungstic, perchromic, permolybdic, persulfuric, permonosulfuric, etc., or organic acids, such as performic, peracetic, perbenzoic, monoperphthalic, etc. Where strongly acidic conditions exist in the epoxidation reagent, as where the per acid has been produced by forming an equilibrium of hydrogen peroxide, carboxylic acid and percarboxylic acid in the presence of a mineral acid, it is desirable to treat the per acid reagent prior to its use with a base not only to destroy the mineral acid catalyst but also to add base in sufficient quantity to depress the acidity of the reagent sufficiently that the oxirane ring is not opened.

I have also produced the epoxy compound by treatment of the corresponding 2,6-dimethyl-7-octene-2-yl compound with gaseous oxygen. Thus, air blowing of 2,6-dimethyl-7-octene-2-ol yields 2,6-dimethyl-7,8-epoxy-octane-2-ol. The same compound is produced by the thermal decomposition of hydroperoxides, such as tertiary butyl hydroperoxide, dissolved in the unsaturated alcohol.

Existence of both the isopropenyl and isopropylidene forms of citronellal is known, Simonsen, The Terpenes, vol. I, page 71 et seq., 2nd edition; see also Carroll et al., Journal of The Chemical Society, pages 3457–3461 (1950); but natural citronellal probably contains largely or only the isopropylidene form, whereas the product produced on dehydration of hydroxycitronellal contains largely or only the isopropenyl form. Irrespective of the confusion which may exist in the prior art as to the identity of the two forms, I find that the citronellal produced according to my present invention resembles most closely purified natural citronellal in organoleptic properties and is useful for the same or similar purposes. Upon treatment with acids, as is known, the isopropylidene form of citronellal cyclizes to form isopulegol. The isopropenyl form of citronellal behaves similarly but at a somewhat slower rate.

It is evident to those skilled in the art that if the 2,6-dimethyl-2,7-octadiene employed for hydration to 2,6-dimethyl-7-octene-2-ol is optically inactive, then all of its derivatives will be optically inactive. Such optically inactive 2,6-dimethyl-2,7-octadiene will result from selective hydrogenation of myrcene and will result from pyrolysis of optically inactive pinane. However, if optically active pinane is pyrolyzed, then the 2,6-dimethyl-2,7-octadiene produced and all of its derivatives disclosed herein and resulting from conducting the process of my present invention will be optically active. I find that by pyrolyzing optically pure 1-pinane and converting the 2,6-dimethyl-2,7-octadiene resulting therefrom to hydroxy-citronellal, I obtain this latter product substantially optically pure and dextro in sign. Alternatively, levo-citronellal and hydroxy-citronellal would be obtained starting with dextro-pinane.

While various systems of nomenclature can be employed to identify the products discussed herein, I have chosen to employ the trivial popular name, hydroxy-citronellal, rather than 2-hydroxy-dihydro-citronellal. Further, I refer to 2,6-dimethyl-2,7-octadiene rather than to the more correct name, 3,7-dimethyl-1,6-octadiene. It will be recognized by those skilled in the art that the most important acylic terpenic compounds occurring in essential oils are usually regarded as derivatives of 2,6-dimethyl-octane. For the purposes of keeping the nomenclature used herein least confusing and most coherent, I have therefore named all compounds as 2,6-dimethyl-octane derivatives, when not using trivial names.

The following examples are illustrative.

EXAMPLE 1

One thousand grams of myrcene was hydrogenated in the presence of 1.0% by weight of a commercial nickel catalyst, nickel content=25%, at 100–120° C. under a hydrogen pressure of 50–80 p.s.i.g. One mole of hydrogen was added for each mole of myrcene. The hydrogenation product was filtered to remove catalyst, and fractionated through an efficient column at 100 mm. pressure. The fraction boiling at 94.5° C. at 100 mm. pressure was identified as 2,6-dimethyl-2,7-octadiene.

EXAMPLE 2

Pinane, B.P.$_{100\ mm.}$ 100° C., $N_D^{25}$ 1.4607, $D_4^{25}$ 0.8541, $\alpha_D^{25}$ 10 cm. −19.24°, was prepared by catalytic hydrogenation of β-pinene. The pinane was vaporized and passed through a 0.5 inch metal tube at 600–620° C. at a rate of 0.25 gram per minute of liquid condensate. The pyrolysate was fractionated through an efficient col-

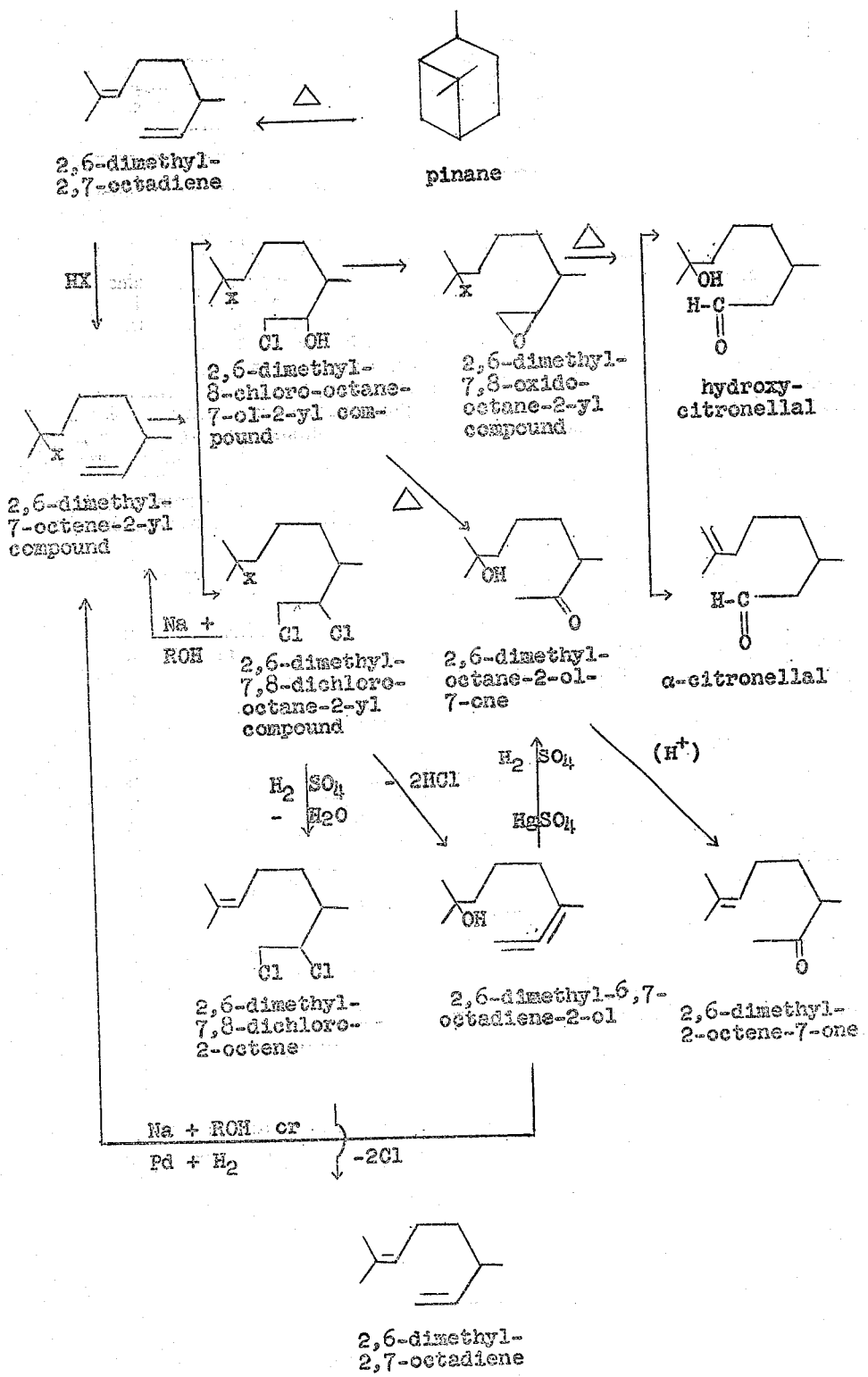

EQUATION I umn. The fraction boiling at 94.5° C. at 100 mm., $N_D^{25}$ 1.4363, $D_4^{25}$ 0.7583, $\alpha_D^{25}$ —7.91°, was 2,6-dimethyl-2,7-octadiene as determined by infrared spectroanalysis.

EXAMPLE 3

Ten thousand grams of 2,6-dimethyl-2,7-octadiene produced by pyrolysis of 1-pinane, 10,000 grams of glacial acetic acid and 20 grams of 98% $H_2SO_4$ were mixed and allowed to stand at 20–30° C. for 48 hours. Fifty grams of anhydrous sodium acetate was then added to neutralize the $H_2SO_4$. The material was then distilled at atmospheric pressure to yield 3100 grams of crude 2,6-dimethyl-7-octene-2-acetate. Saponification of the crude ester followed by fractionation of the saponification product gave 2735 grams of 2,6-dimethyl-7-octene-2-ol, B.P. 82.5° at 10 mm., $D_4^{25}$ 0.8311, $n_D^{25}$ 1.4393, $\alpha_D^{25}$ —10.35° (10 cm. tube).

EXAMPLE 4

Two hundred grams of 2,6-dimethyl-7-octene-2-ol and 500 ml. of water were stirred vigorously while $CO_2$ was bubbled into the mixture. A solution of 166 grams of calcium hypochlorite and 1,000 ml. of $H_2O$ was added slowly. The reaction was exothermic. The temperature was maintained at 0–5° C. by using an ice bath. After all of the hypochlorite solution had been added, the mixture was stirred with $CO_2$ bubbling into it until the aqueous layer did not liberate iodine from an acidified potassium iodide solution. The oil layer was then separated and dried over anhydrous sodium sulfate to yield 264 grams of crude chlorohydrin.

The crude chlorohydrin was stirred for 1 hour with 200 grams of a 50% KOH solution at 85–105° C. The oil layer was separated and dried to yield 232 grams of crude oxide. Fractionation of the crude oxide, followed by infrared spectroanalysis of the fractions, indicated that the crude oxide was 3–5% unchanged 2,6-dimethyl-7-octene-2-ol, 40–45% 7,8-epoxy-2,6-dimethyl-octane-2-ol, B.P. 95–98° C. at about 2–3 mm., $N_D^{25}$ 1.4576, $D_4^{25}$ 0.9531, and 40–45% 7,8-dichloro-2,6-dimethyl-octane-2-ol, B.P. 111–112.5° C., at about the same pressure, $N_D^{25}$ 1.4723, $D_4^{25}$ 1.0325, and 3–5% higher boiling compounds.

Identification of compounds

Infrared spectroanalysis of the fraction boiling at 95–98° C. at about 2–3 mm. indicated that it was a hydroxy epoxide having a tertiary alcohol group, as shown by the presence of the characteristic epoxide and tertiary alcohol absorptions in the spectrum at $12.0\mu$ and $8.7\mu$, respectively.

Thermal cracking of the epoxide ring by heating it at 250° C. gave hydroxy-citronellal, as shown by infrared spectroanalysis. From the above data, it is evident that the fraction boiling at 95–98° C. at about 2 to 3 mm. is 7,8-epoxy-2,6-dimethyl-octane-2-ol.

Infrared spectroanalysis of the fraction boiling at 111–112.5° C. at about 2–3 mm. indicated that it contained a tertiary hydroxyl group and a chloro group, as shown by the presence of the characteristic tertiary hydroxyl group and chloro group absorptions at $8.7\mu$ and $13.5\mu$, respectively. All attempts to hydrolyze the chloride were unsuccessful. However, dehydrochlorination of the hydroxy chloride by heating it with KOH and diethylene glycol at 200° C. gave an unsaturated tertiary alcohol. The catalytic addition of 1 mole of hydrogen to the dehydrochlorination product gave 2,6-dimethyl-7-octene-2-ol, as shown by infrared spectroanalysis. The ultraviolet spectrum of the dehydrochlorination product indicated that it contained no conjugated ethylenic bonds, and infrared spectroanalysis showed a strong absorption in the $5.10\mu$ band. Hydrolysis yielded 2,6-dimethyl-octane-2-ol-7-one. The hydrogenation of the dehydrochlorination product using sodium and isopropanol gave 2,6-dimethyl-7-octene-2-ol, as determined by infrared spectroanalysis. From the above data, the dehydrochlorination product is probably 2,6-dimethyl-6,7-octadiene-2-ol, B.P. 89–90° C. at 10 mm., $N_D^{25}$ 1.4670, $D_4^{25}$ 0.8728, and the hydroxy dichloride is 7,8-dichloro-2,6-dimethyl-octane-2-ol.

EXAMPLE 5

Two hundred grams of 7,8-dichloro-2,6-dimethyl-octane-2-ol was mixed with 150 grams of tertiary butanol. This mixture was added dropwise to 46 grams of sodium suspended in 100 ml. of refluxing toluene. The reaction was exothermic. When all of the reactants had been added, the mixture was stirred for one hour. The excess sodium was then removed by adding water under an atmosphere of nitrogen. The product was then washed and the toluene distilled off to yield 158 grams of high purity, 90–95%, 2,6-dimethyl-7-octene-2-ol, as determined by infrared spectroanalysis.

EXAMPLE 6

One thousand grams of crude hypochlorination product, prepared as shown in Example 4, and 250 grams of $Ca(OH)_2$ were heated with stirring at 200–210° C. and at about 50 mm. absolute pressure. Under these conditions, product distilled off slowly. In four hours the reaction was complete, giving 721 grams of wet distillate. The distillate was then shaken with a solution of 250 grams of $NaHSO_3$ and 750 grams of water. 478 grams of the distillate was insoluble in the $NaHSO_3$ solution. When the aqueous $NaHSO_3$ layer was made alkaline with a 10 NaOH solution, 212 grams of a pleasant smelling oil was obtained. Fractionation of the $NaHSO_3$ soluble oil at reduced pressure, followed by infrared spectroanalysis of the fractions, indicated that it was 5–8% 2,6-dimethyl-1-octene-8-al, B.P.$_{10\ mm.}$ 77–79° C., $N_D^{25}$ 1.4502, $D_4^{25}$ 0.8652, the alpha or isopropenyl form of citronellal, and 90–95% 2,6-dimethyl-2-hydroxy-octane-8-al, B.P.$_{2.8\ mm.}$ 100.5° C., $N_D^{25}$ 1.4467, $D_4^{25}$ 0.9177, hydroxy-citronellal.

The portion of oil that was insoluble in the $NaHSO_3$ solution was mixed with 300 grams of isopropanol. This mixture was added slowly to 115 grams of metallic sodium dispersed in refluxing toluene, 110° C. When all of the reactants had been added, the reaction mixture was refluxed, 110–120° C., for 30 minutes. The reaction mixture was then washed. Removal of the toluene and fractionation gave 386 grams of 2,6-dimethyl-7-octene 2-ol equivalent in quality to the starting alcohol before hypochlorination.

Identification of compounds

Infrared spectroanalysis of the fraction boiling at 77–79° C. at 10 mm. indicated that it was an unsaturated aldehyde containing a disubstituted terminal methylene group, as shown by the presence of the characteristic aldehyde and disubstituted terminal methylene absorptions at $6.2\mu$ and $11.2\mu$, respectively. The catalytic addition of one mole of hydrogen to the unsaturated aldehyde gave 2,6-dimethyl-octane-8-al as determined by comparing the infrared spectrum of the hydrogenation product with the spectrum of a known sample of 2,6-dimethyl-octane-8-al prepared by catalytic hydrogenation of citronellal. From the above date, it is evident that the fraction boiling at 77–79° C. is 2,6-dimethyl-1-octene-8-al.

The product boiling at 100.5° at 2.8 mm. was hydroxy-citronellal as confirmed by comparison of its infrared spectrum with that of an authentic commercial sample of hydroxy-citronellal.

EXAMPLE 7

Fifty grams of 7,8-epoxy-2,6-dimethyl-octane-2-ol was heated at 200–220° C. for 4 hours at atmospheric pressure. Infrared spectroanalysis of the product indicated that it was 10–15% 2,6-dimethyl-1-octene-8-al, 35–40% unchanged 7,8-epoxy-2,6-dimethyl-octane-2-ol and 40–50% hydroxy-citronellal.

EXAMPLE 8

One thousand grams of 2,6-dimethyl-7-octene-2-ol, 3,000 grams of 90% formic acid and 650 grams of anhydrous sodium acetate were stirred at 0–5° C. while 454 grams of chlorine was bubbled into the mixture. When all of the chlorine had been added, the oil layer was separated, washed with a $NaHSO_3$ solution and dried. 1439 grams of dried product was obtained. Infrared spectroanalysis of the product indicated that it was a mixture of 50–55% 7,8-dichloro-2,6-dimethyl-octane-2-ol and 45–50% 8-chloro-2-hydroxy-2,6-dimethyl-octane-7-formate.

The reaction product was then stirred with 1000 grams of a 50% NaOH solution for 1 hour at 105–110° C. and then 1,110 grams of oil was recovered. Infrared spectroanalysis of the oil indicated that it was 50–60%

7,8-dichloro-2,6-dimethyl-octane-2-ol and 40–45% 7,8-epoxy-2,6-dimethyl-octane-2-ol.

EXAMPLE 9

Two hundred grams of oil that was insoluble in NaHSO$_3$ solution and produced as shown in Example 6 was fractionated through an efficient column at reduced pressure. Infrared spectroanalysis of the fractions indicated that the oil was 3–5% lower boiling compounds, 85–90% 7,8-dichloro-2,6-dimethyl-octane-2-ol, and 5–10% 2-hydroxy-2,6-dimethyl-octane-7-one, B.P. $_{2.0\ mm.}$94–97° C., N$_D^{25}$ 1.4506, D$_4^{25}$ 0.8999.

Identification of compounds

Infrared spectroanalysis of the fraction boiling at 94–97° C. at 2.0 mm. pressure indicated that it was a hydroxy ketone, as shown by the intensities of the characteristic tertiary hydroxyl and ketone absorptions at 8.7$\mu$ and 6.1$\mu$, respectively. The hydroxy ketone is probably 2-hydroxy-2,6-dimethyl-octane-7-one formed by dehydrochlorination of the chlorohydrin, 8-chloro-2,6-dimethyl-octane-2,7-diol, to the enol which rearranged to give 2-hydroxy-2,6-dimethyl-octane-7-one.

EXAMPLE 10

Twenty grams of hydroxy-citronellal prepared as shown in Example 6 was heated at reflux at about 200–220° C. and at atmospheric pressure. Water was distilled off as it was formed. Infrared spectroanalysis of the product in the reaction vessel showed that it was 85–90% 2,6-dimethyl-1-octene-8-al, isopropenyl form of citronellal, and 10–15% 2-hydroxy-2,6-dimethyl-octane-8-al, hydroxy-citronellal.

EXAMPLE 11

One hundred grams of crude 8-chloro-2,6-dimethyl-octane-2,7-diol, prepared as in Example 9, was heated to 180–220° C. The products of decomposition were allowed to distill over. Seventy-three grams of distillate was recovered. Infrared spectroanalysis of the distillate indicated that it was 15–20% 2,6-dimethyl-1-octene-8-al, 70–75% 8-chloro-2,6-dimethyl-1,7-octadiene and 5–10% unidentified materials.

EXAMPLE 12

7,8-epoxy-2,6-dimethyl-octane-2-ol, $\alpha_D^{25}$ +0.95° (10 cm. tube), is prepared from optically active 2,6-dimethyl-2,7-octadiene, which, in turn, is produced by fractionation of the vapor phase pyrolysis product derived from 1-pinane. The epoxy alcohol is fed at a rate of about 2 ml. per minute (liquid) to one end of a 316 stainless steel tube about 6 feet long and 0.16 inch in diameter and heated to about 500° C. A stream of nitrogen or other inert gas, about 250 ml. per minute, is added to the same end of the tube as is used to feed the epoxy alcohol. A condenser is employed at the outlet end of the tube for condensing the pyrolysate. It is difficult to measure the true temperature of the tube or gas and vapor stream passing through the tube, since conduction and radiation effects tend to give false readings of the temperature when measured by a pyrometer or otherwise. Consistent, though more or less incorrect, temperature readings can be secured if the tube is properly heated by a salt bath or by electric resistance heating, and such consistent readings permit production of pyrolysate of consistent quality. It is therefore best to begin the pyrolysis at, say, 500° C. and raise or lower the apparent temperature until an apparent temperature is found which produces a pyrolysate of desired quality. The pyrolysate quality can be checked readily by any of several convenient procedures. Thus, concentrated aqueous sodium bisulfite extraction of pyrolysate dissolves hydroxy-citronellal quantitatively from the oil layer and unreacted epoxide and hydrocarbons are insoluble. An alternate quality check is easily made by infrared analysis.

If the tube temperature is too low, then conversion of epoxide to aldehyde is unsatisfactory. If the tube temperature is too high, conversion of epoxide may be complete, but yield of hydroxy-citronellal may be too low due to cracking of the ten carbon atom chain to coke and lower molecular weight fragments not readily condensed.

It will be appreciated by those skilled in the art that many variations in pyrolysis conditions can be made and still obtain satisfactory pyrolysate. Thus, the tube can be made longer or shorter, smaller or larger diameter, etc. It is necessary then only to find a suitable apparent operating temperature that gives a good quality pyrolysate.

In a typical pyrolysis, made after selecting an indicated temperature of 490–500° C., which tests of pyrolysate showed was within a satisfactory operating range when the specific equipment and conditions stated above were used, two hundred grams of the epoxy alcohol was pyrolyzed and 192 grams of pyrolysate was condensed and recovered. It is was fractionated by distillation, and the fractions were analyzed by infrared spectroanalysis to show that the pyrolysate contained 3–5% low boiling hydrocarbons, 25–30% of unchanged 2,6-dimethyl-7,8-epoxy-octane-2-ol and 65–68% 2-hydroxy-2,6-dimethyl-octane-8-al, hydroxy-citronellal, the main fraction of which boiled at 100–101° C. at 2.8 mm. and showed N$_D^{25}$ 1.4467, D$_4^{25}$ 0.9176 and $\alpha_D^{25}$ +8.56°, 10 cm. tube. The recovered unchanged epoxy alcohol was of quality suitable for recycling to a following pyrolysis.

EXAMPLE 13

Two hundred grams of 2-chloro-2,6-dimethyl-7-octene and 500 ml. of water were stirred vigorously while CO$_2$ was bubbled into the mixture. A solution of 150 grams of calcium hypochlorite and 1,000 ml. of water was added slowly. The reaction was exothermic. The temperature was maintained at 0–5° C. by using an ice bath. After all of the hypochlorite solution had been added, the mixture was stirred with CO$_2$ bubbling into it until the aqueous layer would not liberate iodine from a saturated KI solution. The oil layer was then separated and dried over anhydrous Na$_2$SO$_4$ to yield 253 grams of crude chlorohydrin. Infrared spectroanalysis of the crude chlorohydrin indicated that it was 5–10% unchanged 2-chloro-2,6-dimethyl-7-octene, 20–25% 2,8-dichloro-2,6-dimethyl octane-7-ol and 60–65% 2,7,8-trichloro-2,6-dimethyl-octane. Stirring the crude chlorohydrin with a 10% NaOH solution at 20–50° C. converted the 2,8-dichloro-2,6-dimethyl-octane-7-ol to 7,8-epoxy-2-chloro-2,6-dimethyl-octane. The 2,7,8-trichloro-2,6-dimethyl-octane and 2-chloro-2,6-dimethyl-7-octene were unchanged.

The crude product prepared above is now treated with 50 grams lime and 200 ml. water at reflux for 24 hours. The lime is removed by filtration and the aqueous and organic phases are separated. It is found that the chlorine attached to the tertiary carbon atoms at the 2-position is replaced by hydroxyl, but that the chlorine atoms attached to the 7- or 8-positions are unchanged, as are the epoxy linkages. It is found that this hydrolyzed product can be fractionated by distillation to secure purified 2-hydroxy-7,8-epoxy-2,6-dimethyl-octane and the 2-hydroxy-7,8-dichloro-2,6-dimethyl-octane.

Treatment of 2-bromo-2,6-dimethyl-7-octene by the above procedure also yields 2-hydroxy-7,8-epoxy-2,6-dimethyl-octane via the analogous bromo intermediates.

EXAMPLE 14

Two hundred grams of 2-methoxy-2,6-dimethyl-7-octene is treated by the procedure used in Example 13 for treating 2-chloro-2,6-dimethyl-7-octene. The crude isolated chlorohydrin is found to consist of a mixture of 2-methoxy-8-chloro-2,6-dimethyl-octane-7-ol and 2-methoxy-7,8-dichloro-2,6-dimethyl-octane. On treatment with the 10% caustic soda solution, the chlorohydrin is converted to the epoxide, 2-methoxy-7,8-epoxy-2,6-dimethyloctane, which can be separated from the unchanged 2-methoxy-7,8-dichloro-2,6-dimethyl-octane.

Pyrolysis of the epoxide according to the procedure employed in Example 12 for treatment of 7,8-epoxy-2,6-dimethyl-octane-2-ol yields a pyrolysate rich in 2-methoxy-2,6-dimethyl-octan-8-al, the methyl ether of hydroxycitronellal. When methanol is split out of this ether, as by treatment with strong acids, the alpha form of citronellal is produced along with some of its cyclization product, isopulegol.

EXAMPLE 15

As illustrative of the treatment of a 2-acyloxy compound, when the acetate ester of 2,6-dimethyl-7-octene-2-ol is hypochlorinated by a procedure analogous to the one employed in Example 13 or in Example 4, the crude chlorhydrin product is found to consist largely of 2-acetoxy-2,6-dimethyl-7,8-dichloro-octane and 2-acetoxy-2,6-dimethyl-8-chloro-octane-7-ol. On treatment with excess aqueous alkali at reflux, the mixture of products produced consists of 2-hydroxy-2,6-dimethyl-7,8-dichloro-octane and 7,8-epoxy-2,6-dimethyl-octan-2-ol.

EXAMPLE 16

4,350 grams of 40% peracetic acid and 261 grams of anhydrous sodium acetate were stirred at 10–20° C. while 3,500 grams of 2,6-dimethyl-7-octene-2-ol was added over a period of one hour. An ice bath was required to keep the temperature below 20° C. The temperature was then held at 20–30° C. for 24 hours. The reaction mixture was then washed twice with four-liter portions of water to remove the acetic acid and unreacted peracetic acid. The oil layer was separated and washed with a 10% NaOH solution and then dried over anhydrous $Na_2SO_4$ to give 3615 grams of crude 7,8-epoxy-2,6-dimethyl-octane-2-ol. The crude epoxide was fractionated through an efficient column at reduced pressure. Infrared spectroanalysis of the fractions indicated that the crude epoxide contained 10–12% unchanged 2,6-dimethyl-7-octene-2-ol, 78–82% 7,8-epoxy-2,6-dimethyl-octane-2-ol, B.P.$_{1.0\ mm.}$ 79° C., and 5–8% higher boiling hydroxy compounds. The 7,8-epoxy-2,6-dimethyl-octane-2-ol was identified by pyrolyzing it to hydroxycitronellal as shown in Example 17.

EXAMPLE 17

Two hundred grams of optically active 7,8-epoxy-2,6-dimethyl-octane-2-ol was pyrolyzed in the vapor phase by passing it through a stainless steel tube with $CO_2$ as a carrier gas to 490–500° C. 192 grams of pyrolysate was recovered. Fractionation of the pyrolysate followed by infrared spectroanalysis of the fractions indicated that it contained 3–5% low boiling hydrocarbons, 25–30% unchanged 7,8-epoxy-2,6-dimethyl-octane-2-ol, and 65–68% 2-hydroxy-2,6-dimethyl-octane-8-al, hydroxy-citronellal.

EXAMPLE 18

Two hundred grams of 7,8-epoxy-2,6-dimethyl-octane-2-ol was mixed with 1.0 gram of a 36% aqueous HCl solution and passed through an iron tube at 400° C. The epoxy alcohol was added dropwise so that it vaporized at one end of the tube and passed from the other end of the pyrolysis tube to a condenser. Pyrolyzate weighing 166 grams was recovered along with 17 grams of water. Fractionation of the pyrolyzate, followed by infrared spectroanalysis of the fractions, indicated that it was 20–25% hydrocarbons, B.P.$_{100\ mm.}$ 60–100° C.; 58–62% 2,6-dimethyl-1-octene-8-al, α-citronellal, B.P.$_{10\ mm.}$ 77–79° C., and 18% unidentified higher boiling compounds.

EXAMPLE 19

Five hundred grams of 2-chloro-2,6-dimethyl-7-octene was added slowly to a stirring mixture of 600 grams of 40% peracetic acid and 60 grams of anhydrous sodium acetate, the temperature being kept at 20–30° C. by means of an ice bath for 24 hours. The reaction mixture was then washed with two 500 ml. portions of water and 100 ml. of a 5% NaOH solution to give 528 grams of crude 2-chloro-7,8-epoxy-2,6-dimethyl-octane.

Two hundred grams of the crude 2-chloro-7,8-epoxy-2,6-dimethyl-octane, 200 ml. of water and 58 grams of $Ca(OH)_2$ were stirred at reflux temperature, 100–105° C., for 10 hours. The excess lime was removed by filtering. 158 grams of oil was recovered. Infrared spectroanalysis of the oil indicated that it was 5–10% unchanged 2-chloro-7,8-epoxy-2,6-dimethyl-octane, 10–15% 2,6-dimethyl-7-octene-2-ol and 65–70% 7,8-epoxy-2,6-dimethyl-octane-2-ol.

EXAMPLE 20

Four hundred ninety-seven grams of 2,6-dimethyl-7-octene-2-ol was blown with oxygen at 75–85° C. for fifty hours, at the end of which time the peroxide number was 1100. The oxidation product was then heated and stirred for one hour at 125–135° C. The peroxide number dropped from 1100 to 13. The reaction product was then washed with a 10% sodium bicarbonate solution to remove any organic acids that might have been formed during the oxidation. The acid-free oil, 472 grams was fractionated through an efficient column at 10 mm. pressure. Infrared spectroanalysis of the fractions indicated that the oil was 89% unchanged 2,6-dimethyl-7-octene-2-ol, 5–7% 7,8-epoxy-2,6-dimethyl-octane-2-ol and 5–7% high boiling hydroxy compounds. The high boiling hydroxy compounds are probably formed by the hydration of the epoxide during the thermal decomposition of the peroxides.

EXAMPLE 21

Fifty grams of 2,6-dimethyl-7-octene-2-ol, 300 ml. of acetone, 0.05 gram of $V_2O_5$ and 100 grams of hydrogen peroxide, 35%, were mixed at 25° C. and allowed to stand. The solution slowly turned orange as the $V_2O_5$ dissolved. After standing three days, the solution had changed to green in color. A sample of the reaction mixture was diluted with water and the oil layer recovered. Infrared spectroanalysis of the oil layer indicated that it was only about 90% 2,6-dimethyl-7-octene-2-ol. Another 100 grams of 35% hydrogen peroxide was added to the mixture and allowed to stand for four days. The solution turned orange when the hydrogen peroxide was added and slowly changed to a green after four days. A sample of the mixture was again diluted with water and the oil layer recovered. Infrared spectroanalysis of the oil layer showed that it contained 75–80% unchanged 2,6-dimethyl-7-octene-2-ol and 10–15% 7,8-epoxy-2,6-dimethyl-octane-2-ol.

EXAMPLE 22

The above experiment was duplicated exactly except that 0.05 gram of chromium trioxide was employed as the oxygen transfer agent instead of vanadium pentoxide. Fractionation of the whole product yielded about 7% of 7,8-epoxy-2,6-dimethyl-octane-2-ol, but about 20% of the olefinic alcohol had been converted. The remainder of the reaction product consisted of 2,6-dimethyl-octane-2,7,8-triol formed by hydration of the oxide and remained as a distillation residue.

EXAMPLE 23

One hundred grams of 2-chloro-7,8-epoxy-2,6-dimethyl-octane was added slowly to 100 grams of a refluxing 50% methanolic KOH solution (70–75° C.). The mixture was refluxed for 1 hour, after all of the chloro-epoxide had been added. The reaction mixture was then washed with water to remove KOH and methanol. Eighty-four grams of oil was recovered. Fractionation of the oil, followed by infrared spectroanalysis of the fractions, indicated that it contained 10–15% of material boiling at 44–70° C. at 10 mm. pressure, a mixture of hydrocarbons and 7,8-epoxy-2,6-dimethyl-1-octene, 60–65% 2-methoxy-7,8-epoxy-2,6-dimethyl-octane, B.P.$_{1.0\ mm.}$ 70–75° C., and 15–20% 7,8-epoxy-2,6-dimethyl-octane-2-ol, B.P.$_{1.0\text{ mm}}$ 78–82° C.

It will be appreciated that the foregoing examples are only illustrative of the many variations possible in the present invention. For example, the substituent in the 2-position can be varied over a wide range. Ordinarily, however, they will be selected from the group consisting of —OH, Cl—, Br—, lower alkoxy and the acyloxy group of the lower carboxylic acids. This is not because other ethers and esters are not suitable, but because the indicated 2-yl compounds are easier to prepare than the higher ethers and esters. However, in some instances, as when it is desired to produce the maximum amount of hydroxy-citronellal, it may be preferable to employ compounds in which the HX is not as readily removed on pyrolysis as is the case with the 2-chlor or bromo compounds and lower esters such as the formate. Moreover, since the esters and ethers of hydroxy-citronellal are also useful, per se, in perfumery, it may be desirable to introduce the ester group ultimately desired at the beginning of the process.

The 2-halo-dihydrocitronellal, however, is not useful, per se, in perfumery, and when a 2-halo compound is employed in the process, it will ordinarily be either replaced by —OH or removed in the form of HX either before or after the isomerization of the epoxy group to the aldehyde.

The citronellal and hydroxy-citronellal produced by the present invention are, of course, useful, per se, in perfumery. In addition, the citronellal can be isomerized to isopulegol, which, in turn, can be hydrogenated to menthol. This menthol, when prepared from 1-pinane as described herein, is 1-menthol. Alternatively, the hydroxy-citronellal can be reduced to 2-hydroxy-dihydrocitronellol, which on dehydration yields citronellol, another valuable material.

The epoxides contemplated herein are further useful in that the epoxy group can be reduced, such as by catalytic, i.e., nickel, hydrogenation reduction with poly-metal hydrides, etc. to form a mixture of 2-yl-7-hydroxy and 2-yl-8-hydroxy compounds. The 2,8-diol is the hydroxy-citronellol of commerce, and the 2,6-dimethyl-octane-2,7-diol in a new glycol having a pleasant odor and also useful in perfumery. Citronellol, of course, results from the selective reduction of the dehydrated oxide.

Having described the invention, what is claimed is:

1. The process which comprises epoxidizing a compound of the formula $$(CH_3)_2C(x)(CH_2)_3CH(CH_3)CH=CH_2$$

wherein $x$ is a radical selected from the class consisting of —OH, Cl—, Br—, a lower alkoxy radical and an acyloxy radical of a lower carboxylic acid to form the 7,8-epoxy analogue of the starting material and thereafter thermally isomerizing the epoxy group to an aldehyde group whereby there is produced at least one compound of the formula $$(CH_3)_2C(Z)(CH_2)_3CH(CH_3)CH_2CHO$$

wherein Z is selected from the group of —OH, Cl—, Br—, a lower alkoxy radical, an acyloxy radical of a lower carboxylic acid and a carbon-carbon double bond involving the number 2 carbon atom.

2. The process of claim 1 in which the epoxidation is effected by first treating the unsaturated compound with a hypohalous acid selected from the class consisting of hypochlorous acid and hypobromous acid to form a vicinal halohydrin and then dehydrohalogenating the halohydrin to form the epoxide.

3. The process of claim 1 in which the epoxy group is formed by treating the unsaturated compound with a per acid under weakly acidic conditions.

4. The process of claim 1 in which the epoxy group is formed by treating the unsaturated compound with gaseous oxygen.

5. The process of claim 1 in which the epoxy group is formed by the thermal decomposition of hydroperoxides dissolved in the unsaturated compound.

6. The process of claim 1 in which $x$ is —OH.

7. The process of claim 1 in which $x$ is Cl—.

8. The process of claim 7 in which the $x$ radical is hydrolyzed to an —OH radical prior to the isomerization of the epoxy group.

9. The process of claim 1 in which $x$ is a lower alkoxy radical.

10. The process of claim 1 in which $x$ is an acyloxy radical of a lower carboxylic acid.

11. The process of claim 10 in which the $x$ radical is hydrolyzed to an —OH radical prior to the isomerization of the epoxy group.

12. The process which comprises treating a compound of the formula $(CH_3)_2C(x)(CH_2)_3CH(CH_3)CH=CH_2$, wherein $x$ is a radical selected from the class consisting of —OH, Cl—, Br—, a lower alkoxy radical and an acyloxy radical of a lower carboxylic acid with a hypohalous acid selected from the class consisting of hypochlorous acid and hypobromous acid to form a vicinal halohydrin and dehydrohalogenating the halohydrin to form a 7,8-epoxy compound of the formula

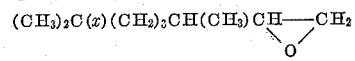

13. The process which comprises treating a compound of the formula $(CH_3)_2C(x)(CH_2)_3CH(CH_3)CH=CH_2$, wherein $x$ is a radical selected from the class consisting of —OH, Cl—, Br—, a lower alkoxy radical and an acyloxy radical of a lower carboxylic acid with a per acid under weakly acidic conditions to form a compound of the formula

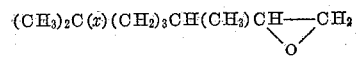

14. The process of claim 13 in which the per acid is a per acid of a lower aliphatic carboxylic acid, and the treatment is effected in the presence of an alkaline buffer.

15. The process which comprises heating a solution of an organic hydroperoxide in a compound of the formula $(CH_3)_2C(x)(CH_2)_3CH(CH_3)CH=CH_2$, wherein $x$ is a radical selected from the class consisting of —OH, Cl—, Br—, a lower alkoxy radical and a radical of a lower carboxylic acid to thermally decompose the hydroperoxide

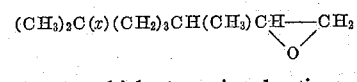

16. The process which comprises heating a compound of the formula

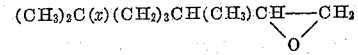

wherein $x$ is a radical selected from the class consisting of —OH, Cl—, Br—, a lower alkoxy group and an acyloxy group of a lower carboxylic acid at a temperature above about 200° C. to cause isomerization of the epoxide group to an aldehyde group whereby there is produced at least one compound of the formula $$(CH_3)_2C(Z)(CH_2)_3CH(CH_3)CH_2CHO$$

wherein Z is selected from the group consisting of —OH, Cl—, Br—, a lower alkoxy radical, an acyloxy radical of a lower carboxylic acid and a carbon-carbon double bond involving the number 2 carbon atom.

17. The process of claim 16 in which $x$ is —OH.

18. The process which comprises treating 2,6-dimethyl-2-chloro-7-octene with a per acid under weakly acidic conditions, hydrolyzing the chloro group to a hydroxy group and heating the resulting 2,6-dimethyl-7,8-epoxy-octane-2-ol at a temperature above about 200° C. to cause isomerization of the epoxy group to an aldehyde group and form at least one compound selected from the class consisting of 2-hydroxy-dihydrocitronellal and citronellal.

19. The process of claim 18 in which the per acid is the per acid of a lower carboxylic acid.

20. The process which comprises heating a compound of the formula $$(CH_3)_2C(x)(CH_2)_3CH(CH_3)CHOH—CH_2Cl$$

wherein $x$ is a radical selected from the class consisting of —OH, Cl—, Br—, a lower alkoxy group and an acyloxy group of a lower carboxylic acid at a temperature above 200° C. in the presence of a base and distilling aldehyde from the reaction mixture during the reaction whereby there is produced at least one compound of the formula $$(CH_3)_2C(Z)(CH_2)_3CH(CH_3)CH_2CHO$$

wherein Z is selected from the group consisting of —OH, Cl—, Br—, a lower alkoxy radical, an acyloxy radical of a lower carboxylic acid and a carbon-carbon double bond involving the number 2 carbon atom.

21. Derivatives of 2,6-dimethyl-octane selected from the class consisting of those of the formula $$(CH_3)_2C(x)(CH_2)_3CH(CH_3)CH\!\!-\!\!-\!\!CH_2$$
$$\diagdown\!O\!\diagup$$

wherein $x$ is a radical selected from the class consisting of —OH, Cl—, Br—, a lower alkoxy radical and an acyloxy radical of a lower carboxylic acid.

22. 2,6-dimethyl-7,8-epoxy-octane-2-ol.

23. 2,6-dimethyl-2-chloro-7,8-epoxy-octane.

24. 2,6-dimethyl-2-alkoxy-7,8 - epoxy - octanes wherein the alkoxy radical is a lower alkoxy radical.

25. 2,6-dimethyl-2-methoxy-7,8-epoxy-octane.

26. 2,6-dimethyl-2-acyloxy-7,8-epoxy-octanes wherein the acyloxy radical is the acyloxy radical of a lower carboxylic acid.

27. 2,6-dimethyl-7,8-epoxy-octane-2-ol acetate.

28. Derivatives of 2,6-dimethyl-octane selected from the class consisting of those of the formula $$(CH_3)_2C(x)(CH_2)_3CH(CH_3)CH(OH)CH_{2y},$$

wherein $x$ is a radical selected from the class consisting of —OH, —Cl, —Br, a lower alkoxy radical and an acyloxy radical of a lower carboxylic acid, and $y$ is a radical selected from the class consisting of —Br and —Cl.

References Cited in the file of this patent

UNITED STATES PATENTS

| | | |
|---|---|---|
| 1,114,734 | Davis | Oct. 27, 1914 |
| 2,061,377 | Groll | Nov. 10, 1936 |
| 2,159,507 | Law | May 23, 1939 |
| 2,288,344 | Brooks | June 30, 1942 |
| 2,306,332 | Flisik | Dec. 22, 1942 |
| 2,411,762 | Swern | Nov. 26, 1946 |
| 2,457,329 | Swern | Dec. 28, 1948 |
| 2,501,026 | Cahnmann | Mar. 21, 1950 |
| 2,567,842 | Erickson | Sept. 11, 1951 |
| 2,650,927 | Gasson | Sept. 1, 1953 |
| 2,704,774 | Gasson | Mar. 22, 1955 |
| 2,723,294 | Benoit | Nov. 8, 1955 |
| 2,812,355 | Fox | Nov. 5, 1957 |

OTHER REFERENCES

Pigulevskii et al.: Doklady Akad. Nauk. USSR, vol. 63, pp. 677–80 (1948), abstracted in Chem. Abstr., vol. 43, p. 4628 (1949).